United States Patent [19]

Girardon et al.

[11] Patent Number: 4,663,926

[45] Date of Patent: May 12, 1987

[54] HEAD FOR LAYING OPTICAL FIBERS IN ALTERNATING-LAY GROOVES IN A CYLINDRICAL CORE

[75] Inventors: Noël Girardon, Sartrouville; Jack Delbar, Conflans Sainte Honorine, both of France

[73] Assignee: Les Cables de Lyon, France

[21] Appl. No.: 914,388

[22] Filed: Oct. 1, 1986

[30] Foreign Application Priority Data

Oct. 1, 1985 [FR] France .................. 8514550

[51] Int. Cl.[4] .............. H01P 11/00; D07B 3/00; G02B 6/04; H01B 13/02

[52] U.S. Cl. ................ 57/6; 57/9; 57/13; 57/311; 57/352; 350/96.23

[58] Field of Search .......... 57/6, 9, 13, 14, 15, 57/311, 314, 352, 361, 138; 350/96.23, 96.24, 96.29, 96.3

[56] References Cited

U.S. PATENT DOCUMENTS

| | | | |
|---|---|---|---|
| 4,154,049 | 5/1979 | King et al. | 57/9 |
| 4,248,035 | 2/1981 | Skillen et al. | 57/6 |
| 4,309,864 | 1/1982 | Hulin | 57/6 |
| 4,309,866 | 1/1982 | Fombellida | 57/15 |
| 4,388,799 | 6/1983 | Vives | 57/6 |
| 4,411,130 | 10/1983 | Dubois et al. | 57/352 |

FOREIGN PATENT DOCUMENTS

| | | |
|---|---|---|
| 0058594 | 8/1982 | European Pat. Off. |
| 0061124 | 9/1982 | European Pat. Off. |
| 0113973 | 7/1984 | European Pat. Off. |
| 2022644 | 12/1979 | United Kingdom |

*Primary Examiner*—John Petrakes
*Attorney, Agent, or Firm*—Sughrue, Mion, Zinn, Macpeak & Seas

[57] ABSTRACT

A head (10) for laying optical fibers (2) in alternating lay grooves (1A) in a cylindrical core (1), the head comprising a die-holder (11) interconnecting three dies: an inlet die (12); an indexing die (13) including indexing combs; and an insertion die (14); each optical fiber being guided through an orifice (12A) in the inlet die, then through an orifice (13A) in the indexing die, and finally being laid in a groove of the core by the insertion die, said head further including, upstream from the inlet die, a fixed mandrel (20) through which the core passes, said mandrel being constituted by a tube (21) having a front guide (22) disposed at its upstream end with the optical fibers passing through said front guide, said mandrel further including a series of rotating disks (23) located between said front guide and said inlet die.

3 Claims, 2 Drawing Figures

HEAD FOR LAYING OPTICAL FIBERS IN ALTERNATING-LAY GROOVES IN A CYLINDRICAL CORE

The present invention relates to a head for laying optional fibers in the grooves of a cylindrical core, said grooves being sinuous, i.e. of alternating lay.

BACKGROUND OF THE INVENTION

Generally speaking, a fiber-laying installation comprises a drum on which the core is wound, a plate on which reels of optical fiber are mounted, a head for laying the fibers in grooves in the core, at least one distributor die between the reel-carrying plate and the laying head, and then a covering device and a pick-up drum for winding in the core fitted with the fibers. Various traction and control devices are also to be found at various points along the production line.

In such an installation, the laying head is a key member whose main function is to place the fibers in the grooves in the core without subjecting them to high tension or pressure while curving them very little. In addition, the laying head must be as light as possible, particularly when it is the sole rotary component, as occurs when the grooves have an alternating, back-and-forth lay.

Heads for laying optical fibers in alternating lay grooves in a cylindrical core are known and comprise three successive dies: an inlet die: and indexing die: and a die for inserting the optical fibers into the core.

Published European patent application EP-A-0 058 594 relates to a head for simultaneously laying optical fibers in a grooved cylindrical support, where the head comprises a hollow tube having the grooved cylindrical support passing longitudinally therethrough, a washer which is fixed to and axially-aligned with the tube, and which has a central opening therethrough whose inside edge is provided with radially-projecting portions each of which rests on the bottom of a groove in the support, and a part for inserting optical fibers into the support grooves. said part having a central opening aligned with the central opening of the washer and allowing the support to pass therethrough.

However, in such laying heads, the fibers are unguided between the last distributor die and the inlet die to the laying head, thereby giving rise to friction between the fibers, or worse still to fiber tangling.

Preferred embodiments of the present invention provide effective guidance for the fibers and keep them apart.

SUMMARY OF THE INVENTION

This is a achieved by extending the laying head to include a mandrel which runs between the last distributor die and the inlet die to the head per se.

The present invention provides a head for laying optical fibers in alternating lay grooves in a cylindrical core, the head comprising a die-holder interconnecting three dies: an inlet die; an indexing die including indexing combs; and an insertion die; each optical fiber being guided through an orifice in the inlet die, then through an orifice in the indexing die, and finally being laid in a groove of the core by the insertion die, said head further including, upstream from the inlet die, a fixed mandrel through which the core passes, said mandrel being constituted by a tube having a front guide disposed at its upstream end with the optical fibers passing through said front guide, said mandrel further including a series of rotating disks located between said front guide and said inlet die.

BRIEF DESCRIPTION OF THE DRAWINGS

An embodiment of the invention is described by way of example with reference to the accompanying drawings, in which.

MORE DETAILED DESCRIPTION

Figure 1:
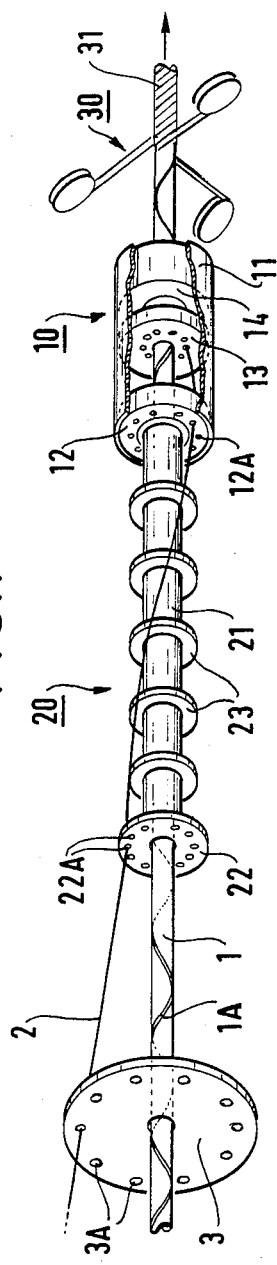
FIG. 1 is a partially cut away diagrammatic perspective view of a laying installation including a laying head in accordance with the invention.

FIG. 1 shows only a portion of a laying installation. A core 1 is prevented from rotating about its longitudinal axis and is provided with grooves 1A in its surface which follow an alternating lay. A fixed distributor die 3 has the core 1 passing through its center and has a plurality of orifices 3A close to its periphery with respective optical fibers 2 passing therethrough. The fibers are delivered by reels which are not shown. The core and the fibers pass through a fixed mandrel 20 and then through a laying head per se 10 before passing through a covering device 30 which winds tape 31 round the core 1 after the fibers have been laid in its grooves. Naturally, the lines 2 representing a single optical fiber could, alternatively, each represent a bundle of optical fibers.

The laying head per se 10 is constituted by a cylindrical die-holder 11 having an inlet die 12, an indexing die 13, and an insertion die 14 fixed thereto.

The inlet die 12 has oblique orifices 12A, each of which has an optical fiber 2 passing therethrough.

Figure 2:
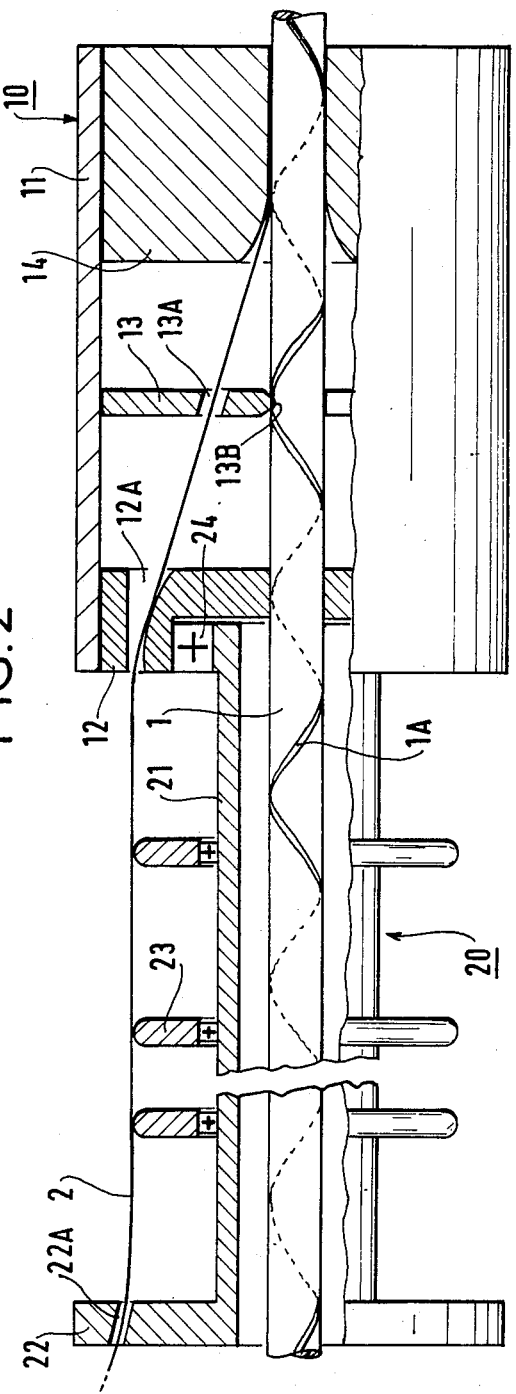
FIG. 2 is a partial longitudinal section through a laying head in accordance with the invention.

The indexing die 13 has orifices 13A and indexing combs 13B which can be seen in FIG. 2 and which engage in respective grooves of the core. The indexing die 13 thus ensures that the insertion die 14 is maintained at an angular position which tracks the real angular position of the grooves.

The orifices 13A through which respective optical fibers 2 pass are merely openings to allow the fibers to pass, they do not provide a fiber-guiding function.

The insertion die 14 serves to lay the fibers in the grooves and to hold them therein until the end of the covering operation.

The mandrel 20 comprises a tube 21 which is rigidly fixed to the production line, i.e. to a set of fixed guide devices, and the die-holder 11 is mounted on the downstream end of the tube 21 of the mandrel 20 by means of a bearing 24 (see FIG. 2). The bearing may be a ball bearing or a roller bearing.

The tube 21 of the mandrel 20 has a front guide 22 with fiber-guiding orifices 22A, and a plurality of disks 23 mounted on respective bearings. Since the die-holder 11 oscillates back and forth, each length of fiber situated between the front guide 21 and the inlet guide 12 also moves back and forth around the tube 21. The mandrel is naturally made long enough to ensure that the angles involved are not too large.

Even at low tension, all of the fibers are pressed against the outside edges of the disks. The angular distance between the fibers remains constant and this avoids any risk of them rubbing against one another or of fibers intended for different grooves tangling with one another.

FIG. 2 shows that the inlet die 12 and the insertion die 14 are at a distance apart which is related to the diameter of the dies so that the angle of a fiber relative to the axis of the core is at an optimum value for keeping friction to a minimum.

We claim:

1. A head for laying optical fibers in alternating lay grooves in a cylindrical core, the head comprising a die-holder interconnecting three dies: an inlet die; an indexing die including indexing combs; and an insertion die; each optical fiber being guided through an orifice in the inlet die, then through an orifice in the indexing die, and finally being laid in a groove of the core by the insertion die, said head further including, upstream from the inlet die, a fixed mandrel through which the core passes, said mandrel being constituted by a tube having a front guide disposed at its upstream end with the optical fibers passing through said front guide, said mandrel further including a series of rotating disks located between said front guide and said inlet die.

2. A head according to claim 1, wherein said die-holder is mounted to the downstream end of said mandrel tube by means of a ball or roller bearing.

3. A head according to claim 1 or 2, wherein the inlet die and the insertion die are held apart at a distance related to the diameter of said die such that the angle of a fiber relative to the core axis is at an optimum value for minimizing friction.

* * * * *

UNITED STATES PATENT AND TRADEMARK OFFICE
CERTIFICATE OF CORRECTION

PATENT NO. : 4,663,926

DATED : May 12, 1987

INVENTOR(S) : Noel Girardon, et al

It is certified that error appears in the above-identified patent and that said Letters Patent is hereby corrected as shown below:

Column 2, line 59, delete "guide 21" and insert --guide 22--.

Signed and Sealed this

Fifteenth Day of September, 1987

*Attest:*

DONALD J. QUIGG

*Attesting Officer*  *Commissioner of Patents and Trademarks*